(12) United States Patent
Chien et al.

(10) Patent No.: US 7,123,303 B1
(45) Date of Patent: Oct. 17, 2006

(54) FOCAL PLANE ARRAY WITH IMPROVED TRANSFER CIRCUIT

(75) Inventors: Ho-Ching Chien, Hsinchu (TW); Chun-Hui Tsai, Hsinchu (TW); Chung-Ren Lao, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 08/227,390

(22) Filed: Apr. 14, 1994

(51) Int. Cl.
*H04N 3/14* (2006.01)
(52) U.S. Cl. ...................... 348/322; 348/312
(58) Field of Classification Search ............... 348/319, 348/316, 322, 323, 312
See application file for complete search history.

(56) References Cited

U.S. PATENT DOCUMENTS

| | | | |
|---|---|---|---|
| 4,548,671 A | 10/1985 | Kosonocky et al. | 156/643 |
| 4,638,345 A | 1/1987 | Elabd et al. | 357/24 |
| 4,763,198 A * | 8/1988 | Tabei | 348/322 |
| 5,040,071 A | 8/1991 | Stevens | 358/213.26 |

* cited by examiner

*Primary Examiner*—Wendy R. Garber
(74) *Attorney, Agent, or Firm*—Saile Ackerman LLC; Stephen B. Ackerman

(57) ABSTRACT

A focal plane array in which information from the pixel forming elements is transferred into a vertical shift register and then from the last stage of the vertical shift registers row by row into a horizontal shift register is provided with a storage element and gate between each vertical register and the corresponding stage of the horizontal register. After the information currently in the storage gates has been transferred to the corresponding HCCD stages, the transfer gate is closed, and the next shift of the vertical registers begins, during a time when the vertical registers would otherwise be stopped, waiting for the multi-phase operation of the horizontal register. This time is used for usefully increasing the time for the vertical shift operation, and the clock is advantageously made slower. Alternatively, a faster frame rate can be handled by conventional clock circuits.

11 Claims, 2 Drawing Sheets

FOCAL PLANE ARRAY WITH IMPROVED TRANSFER CIRCUIT

FIELD OF THE INVENTION

This invention relates to systems for forming an optical image on an array of light detectors, called a focal plane array. More specifically the invention relates to a focal plane array with an improved circuit for scanning the array and producing a waveform that represents an image.

INTRODUCTION

A focal plane array (FPA) is well known but it will be helpful to review the features and terminology that particularly apply to this invention. An FPA commonly has a row and column array of pixel forming elements that detect visible light or infrared radiation. A detector can be formed by a Schottky barrier diode (SBD). An SBD produces a charge when infrared light is absorbed by one side of its junction. The magnitude of the charge depends on the amplitude of the light, and ordinarily an FPA is an analog device. The focal plane array is exposed to radiation and the SBDs are then scanned to detect their charge and to produce a serial output waveform that represents the image and is analogous to a video signal for television. It will be helpful to think of the array as being oriented in a vertical plane, facing a subject that it is to form an image of. In this orientation, the columns of the array run vertically and the rows run horizontally, and this terminology will be used to identify shift registers that form part of the scanning circuit.

The scanning operation proceeds row by row from top to bottom in a way that is analogous to the scan of a television display or camera. Commonly, the charge from each pixel forming element is transferred to a shift register that is positioned alongside a column of SBDs and has a stage for each pixel forming element. These shift registers will be called a "vertical shift register" or "VCCD" because they are implemented as a charge coupled device (CCD). Periodically each SBD is connected to the corresponding position of its shift register and its charge is transferred to the shift register.

A shift register that will be called the horizontal shift register, HCCD, has a stage for each VCCD and the last stage of each VCCD is coupled to its corresponding stage of the HCCD. The corresponding positions in each vertical shift register hold the information for one row of pixels of the FPA, and at an appropriate time in each row scan time, the HCCD is stopped and the information in the last stage of each VCCD is transferred to the HCCD. The VCCDs are shifted once for each row as the scan proceeds, and the information for one row of pixels is transferred to the HCCD with each shift of the VCCDs. The HCCD is then shifted to present the information for all the pixels of a row at a serial output.

THE PRIOR ART

The introductory description is based in part on a review of several FPA's and their CCD's by Kosonocky in SPIE vol. 1308 *Infrared Detectors and Focal Plane Arrays* (1990).

SUMMARY OF THE INVENTION

The focal plane array of this invention is provided with a storage gate and a transfer gate between each VCCD and the associated stage of the HCCD. At an appropriate time period in each row scan time, the information in VCCD is shifted downward one stage, and the information in the last row of vertical shift register stages is transferred to the associated storage gate. At an appropriate point in each row scan time, the transfer gates are opened (made conductive), the information in the storage gates is loaded into the HCCD. Because the trtansfer gate is closed after the information is loaded into the HCCD, the operation of shifting the VCCDs can be started earlier in the row scan period and the clocks that control the operating can be made to switch at a slower rate. With the slower switching rate, these components are easier to construct.

Stated differently, this structure isolates the operation of the vertical shift registers from the operation of the horizontal shift register and thereby permits some of the operations of the VCCD to overlap the operation of the HCCD. Thus for a given frame rate for a focal plane array, the invention provides a significantly longer time for shifting the VCCDs.

One object of the invention is to achieve higher charge transfer efficiency in the VCCDs. The transfer efficiency is the fraction of the charge that is actually transferred from one stage of a shift register to the next. The numerical value of this efficiency is multiplied as the information is shifted from stage to stage, and the overall efficiency is the efficiency of one stage to the power of number of stages. Because these shift registers typically have more than 500 stages, the efficiency of each stage must be very high. The system of this invention achieves a high efficiency by providing more time for transferring charge from each stage to the next in the VCCDs.

Another object of the invention is to achieve lower power dissipation. In this invention, the VCCD clocks switch at a lower rate and thereby reduce the power required for the clock. The power dissipation is lower than that of LACA Line addressed charge Accumulation Device and CSD charge Sweep Device structure but similar to that of conventional structure.

Another object of the invention is to provide an FPA readout circuit that has a simpler device structure than that of LACA Structure and CSD structure, but similar to that of conventional structure.

Another object of the invention is to provide an FPA readout circuit that can be operated at a higher frame rate. The VCCD circuits can operate at a higher frame rate than a similar circuit that does not overlap the vertical shift and the horizontal shift.

THE DRAWING

THE PREFERRED EMBODIMENT

Figure 1:
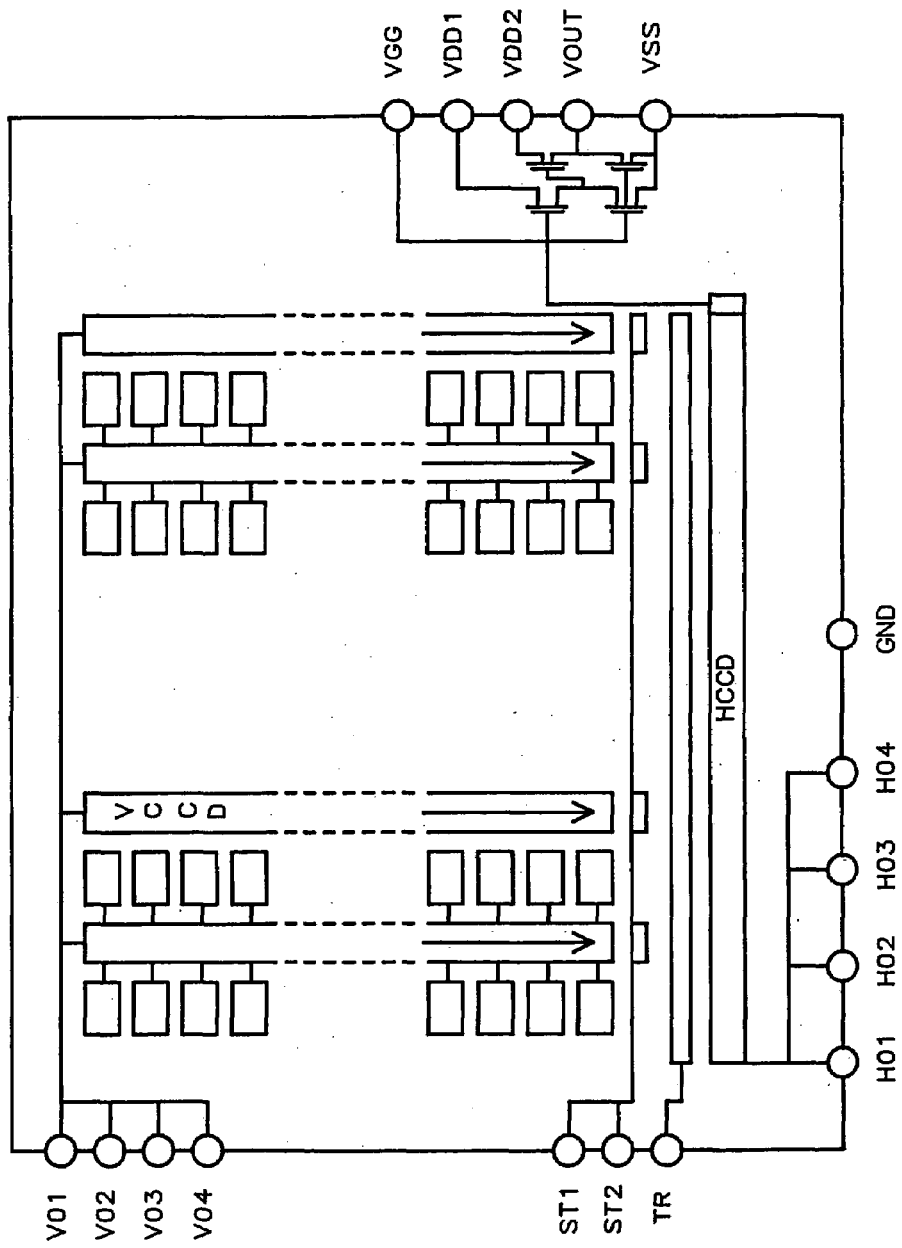
FIG. 1 is a block diagram of a focal plane array and the circuit of this invention.

The Focal Plan Array of FIG. 1—Introduction

The SBD elements are conventional and do not require specific description. They are represented in the drawing by small blocks. Vertically rectangular blocks with the legend VCCD represents a vertical shift register. The downward pointing arrows show the direction of shifting toward the horizontal shift register, down in the drawing. The spacing between the two VCCDs on the left and the two on the right represent a selected number of registers, and the dashed lines in the block for these registers represent a selected number of stages. A horizontal rectangular block HCCD similarly represents the horizontal shift register.

Circles in FIG. 1 represent ground (GND) and other potential points or signal points. Lines between the circles represent either a multi-line bus or a single conducting line for a voltage or a signal, as will be understood from the description.

Clock signals Vø1, Vø2, Vø3 and Vø4 control the vertical registers, and clock signals Hø1, Hø2, Hø3 and Hø4 control the horizontal shift register.

Other circles, VGG, VDD1, VDD2 and VSS, are power supply voltages for a conventional amplifier circuit formed by four FETs. This amplifier receives the output of the last stage of the HCCD and produces a suitable voltage and current at the output point Vout. The output of the horizontal shift register appears serially at a signal point Vout. (The block at the right end of the rectangle for HCCD represents an output stage.)

The drawing shows a multi-conductor bus that connects each horizontal timing circuit to the HCCD and a similar bus arrangement for clock signals Vø1 . . . Vø4. The outline in FIG. 1 only represents the boundary of the Focal plane array chip. The "O" are I/O pads.

Clock signals ST1, ST2 and TR control storage elements and a transfer circuit, as will be described later.

FIG. 1—The Storage and Transfer Circuit

An analog storage element is connected at the output end of each VCCD and holds the information of the last stage of the associated vertical register for a time that will be explained later in the description of FIG. 2. The preferred storage element is a clock controlled gate capacitor; the capacitor is formed by an FET with the gate electrode forming one plate of the capacitor and is connected to receive the output of the last stage of the associated VCCD and the clock signals of FIG. 2. Stated differently, the storage element is part of the CCD structure but is controlled by a different clock.

The storage element is controlled by two clock signals, ST1 and ST2 which operate as a CCD structure. Preferably the storage gate has two stages for increased charge handling capability; clock signal ST1 controls the first stage and clock signal ST2 controls the second stage. Clock signal ST1 falls first and moves the charge to the second stage; then ST2 falls to move the charge to HCCD through the TR gate.

A transfer element, shown in the drawing as a thin rectangle, transfers the signal in each storage element to the associated stage of the HCCD under the control of a clock signal designated TR. The preferred transfer element is an analog gate device. It controls the channel under the gate. The gate is opened (made conductive) when signal TR is high, and the charge is transferred from the VCCD to the HCCD. This gate is closed (not conducting) at all other times.

The storage elements are shown as individual blocks located between the associated VCCD and the transfer element. The line connecting the tops of the boxes is the bus for clock signals ST1 and ST2. These components are well known, the drawing shows the vertical connection from the last stage of a VCCD through the storage element and the transfer element to the corresponding stage of the HCCD by the vertical alignment without interconnecting lines.

Figure 2:
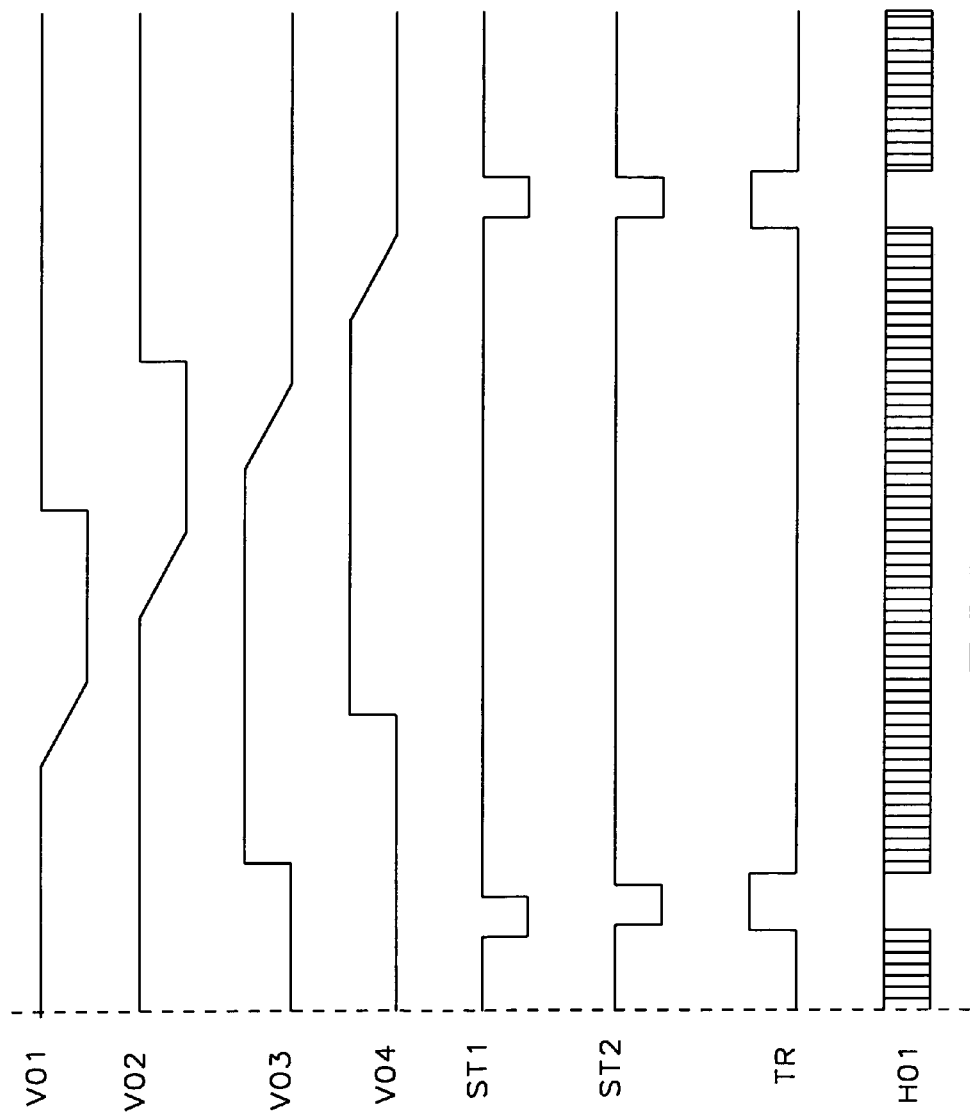
FIG. 2 shows several waveforms that illustrate the operation of the focal plane array and the circuit of this invention.

FIG. 2—The Timing Diagram

Introduction

At an appropriate point in the frame cycle, the information in each pixel element is transferred to the associated stage of a VCCD so the array of VCCD stages holds the information that was originally held in the array of FPA pixel forming elements. The information in the array of VCCD stages is scanned row by row, and FIG. 2 shows the clock waveforms for scanning one row.

The row scan time is established by an industry or government standard or by a manufacturer. These standards provide time between row scans and frame scans that are illustrated by a cathode ray tube television set which has a horizontal retrace at the end of each row and a vertical retrace time at the end of each frame. For example, the familiar NTSC standard for television in the United States and some other countries has a row scan time of 63.5 μs. However, the invention is useful with different scan times.

The FPA of this invention uses the row scan interval more effectively to permit operating the VCCD with a slower clock. The period for the row scan is not changed and the clock provides the same number of shifts as a corresponding conventional FPA, but the times when the clock signals are active (not idle) fill more of the row scan time and the clock switching can be made usefully slower.

At an appropriate point during each row scan, the information in the storage gates is transferred to the corresponding HCCD stages. The scan operation is then no longer dependent on the VCCD after the transfer gate is closed, and each stage of the VCCD is then shifted one position forward.

As FIG. 2 shows, the waveform for clock signal Hø1 has an interval of shifts, represented by closely spaced vertical lines, and an interval when the HCCD is held in a predetermined shift position and is loaded from the storage gate. While the HCCD is being loaded, clock Hø1 is held at an appropriate level (high) to permit the HCCD to accept information from the storage gate. (Clock waveforms Hø2, Hø3 and Hø4, which are not shown, differ in known details that are not significant in this description.)

During the interval represented by the gap in clock waveform Hø1, the transfer gate is opened in response to the signal TR to transmit the charge held by the storage gate, and the information in each storage gate is loaded into the corresponding stage of the HCCD. Then the HCCD is shifted through the length of the number of pixels in a row and this information appears at the same frame rate at output Vout.

During the shift operation on the HCCD, the transfer gate is closed (it isolates the HCCD from the storage gate) in response to the low level of clock signal TR. During the horizontal shift, the information in each stage of the VCCDs is transferred to the corresponding next stage of a VCCD and the information in the last stage of the VCCD is transferred to the associated storage gate.

In the next step, the VCCD's are each shifted to present the information for the next to the last row of light detectors to the HCCD.

OTHER EMBODIMENTS

From this description, those skilled in the art will recognize various modifications within the spirit of the invention and the intended scope of the claims. As a specific example, the circuit can operate with a clock having 2 or 3 phases instead of the preferred 4 phase clock.

The invention claimed is:

1. A focal plane array comprising
a row and column array of pixel forming elements,
a vertical shift register for each column with means connecting the stages of each vertical shift register to receive the information from an associated pixel forming element and timing means connected to each vertical shift register for shifting the vertical shift registers in synchronism,
a horizontal shift register for producing serially at an output the information from one row of the array which is held in a last stage of each of the vertical shift register and timing signal means for shifting the horizontal shift register, and means for transferring the information in the last stage of each vertical shift register to a corresponding stage of the horizontal shift register, comprising, a storage means for each vertical shift register for holding the information from the last stage of the vertical shift register, and a gate for connecting each storage means to the associated stage of the horizontal shift register, means providing a timing signal separate from the column shift register timing means for opening each gate during a time for transferring the information from the storage means to the corresponding stage of the horizontal shift register and for closing the gate at other times and thereby isolating the operation and timing of the vertical shift registers from the operation and timing of the horizontal shift register.

2. The focal plane array of claim 1 wherein the vertical shift registers and the horizontal shift registers are charge coupled devices.

3. The focal plane array of claim 2 wherein the storage means is an analog storage device.

4. The focal plane array of claim 3 wherein the storage means for the last stage of each vertical register comprises a capacitor formed in part by the gate electrode of a field effect transistor.

5. The focal plane array of claim 4 wherein the storage means is a charge coupled device.

6. The focal plane array of claim 5 wherein the focal plane array has timing means producing a first phase and a second phase connected to control the analog storage device.

7. The focal plane array of claim 6 wherein the storage means has a first stage and a second stage for greater charge handling capability.

8. The focal plane array of claim 6 wherein the means for transferring is an analog gate device.

9. The focal plane array of claim 8 wherein the means for transferring is a CCD device.

10. The focal plane array of claim 9 wherein the focal plane array has a clock signal (TR) defining a time for transferring charge from the storage means to the horizontal register and means for transferring is connected to respond to said clock signal.

11. The focal plane array of claim 10 wherein the means for transferring is open during the time for transferring charge from the storage means to the horizontal register and is closed at other times.

* * * * *

UNITED STATES PATENT AND TRADEMARK OFFICE
CERTIFICATE OF CORRECTION

PATENT NO.        : 7,123,303 B1
APPLICATION NO.   : 08/227390
DATED             : October 17, 2006
INVENTOR(S)       : Ho-Ching Chien, Chun-Hui Tsai and Chung-Ren Lao It is certified that error appears in the above-identified patent and that said Letters Patent is hereby corrected as shown below:

Title Page, item (73) Assignee, currently shown as "Industrial Technology Research Institute, Hsinchu (TW)"

should read --Industrial Technology Research Institute, Hsinchu (TW)
Chung Shan Institute of Science and Technology, Taoyuan, (TW)--

Signed and Sealed this

Twenty-third Day of October, 2007

JON W. DUDAS
*Director of the United States Patent and Trademark Office*